US011491590B1

(12) United States Patent
Beckles (10) Patent No.: US 11,491,590 B1
(45) Date of Patent: Nov. 8, 2022

(54) BATTERY REMOVAL APPARATUS FOR PORTABLE COMPUTING DEVICES

(71) Applicant: Kijanna Beckles, Brockton, MA (US)

(72) Inventor: Kijanna Beckles, Brockton, MA (US)

( * ) Notice: Subject to any disclaimer, the term of this patent is extended or adjusted under 35 U.S.C. 154(b) by 157 days.

(21) Appl. No.: 16/936,389

(22) Filed: Jul. 22, 2020

(51) Int. Cl.
*B23P 23/00* (2006.01)
*B23P 19/04* (2006.01)
*H01M 50/209* (2021.01)
*H04M 1/02* (2006.01)

(52) U.S. Cl.
CPC .......... *B23P 19/04* (2013.01); *H01M 50/209* (2021.01); *H01M 2220/30* (2013.01); *H04M 1/0262* (2013.01); *Y10T 29/5139* (2015.01)

(58) Field of Classification Search
CPC ............. H01M 50/20; H01M 2220/30; H01M 50/247; H02J 7/0044; A24F 40/95; Y10T 29/5139; Y10T 29/53274; Y10T 29/49815
USPC ...... 29/564.3, 426.3, 623.1, 623.4, 709, 711, 29/714
See application file for complete search history.

(56) References Cited

U.S. PATENT DOCUMENTS 8,689,461 B1 * 4/2014 Cookson ................. H05B 3/42
219/229
11,045,913 B1 * 6/2021 Wieler ............... H05K 13/0486

* cited by examiner

*Primary Examiner* — Thiem D Phan
(74) *Attorney, Agent, or Firm* — Law Office of Ilya Libenzon (57) ABSTRACT

A battery removal apparatus for use with portable comping devices is disclosed. The battery removal apparatus can be used to remove the battery from a portable computing device. One embodiment having a heating surface 118 used to soften the adhesive 206 which bonds the battery to the housing of the device. The device is placed on the heating surface 118 and secured to the housing of the apparatus with a clamping system 116. In addition, a vacuum suction cup 130 attaches to the battery 208 of the portable computing device. The suction cup 130 and the battery 208, is then lifted out of the portable computing device using a lifting system. As a result, there is a reduction in the risk of puncturing the battery during the removal process. Other embodiments are described and shown.

8 Claims, 7 Drawing Sheets

FIG.5

BATTERY REMOVAL APPARATUS FOR PORTABLE COMPUTING DEVICES

CROSS-REFERENCE TO RELATED APPLICATIONS

This application claims the benefit of provisional patent application Ser. No. 62/877,835, filed 2019 Jul. 23 by the present inventor, which is incorporated by reference in its entirety.

TECHNICAL FIELD

The described embodiments relate generally to battery removal apparatuses. More specifically, disclosed herein are battery removal apparatuses that provide ease of battery removal for servicing.

BACKGROUND ART

The following is a tabulation of some prior art that presently appears relevant:

| U.S. Pats. | | | |
| --- | --- | --- | --- |
| Pat. No. | Kind Code | Issue Date | Patentee |
| 0,229,766 | A1 | 2009 May 14 | Aveldson |
| 0,064,386 | A1 | 2015 Mar. 15 | MAG |
| 0,355,207 | A1 | 2014 Dec. 4 | Stephens |
| 0,192,550 | A1 | 2016 Jun. 30 | Casebolt |

Previously, portable computing device manufacturers consistently aimed to improve the physical qualities of portable computing devices so they could provide an excellent user experience and also keep up with their competitors. The widths and lengths of most portable computing devices—such as cellular phones and laptops— have not changed much, due to users requiring a threshold amount of surface area to interact comfortably with such devices. (e.g., user interfaces on cell phones or track pads on a laptops). Though the overall physical look of these portable computing devices has not changed much, software and minor component improvements have become the main focus for tech companies. Notably, the retail price for mobile computing devices has increased exponentially over the years. As a result, end users tend to hold on to their devices for longer periods of time in order to be cost efficient.

The longer the end user continues to operate the portable computing device, the more susceptible the battery (which is included in most portable computing devices) becomes to losing its full capacity. Resulting in battery replacement and servicing becoming a common practice. The battery is commonly secured within the portable computing device such that the battery remains in place in the event of a fall, this avoids damage to other electronics within the device. A popular battery-securing technique involves applying an adhesive layer between the battery and the housing of the device. The adhesive layer presents a level of difficulty when removing the battery for serving or replacement.

Thus, several types of adhesive pull tabs and apparatuses have been designed to ease the removal of the battery. Stephens discloses a pull tab configured to be disposed between a battery and a casing of a portable computing device; however, these pull taps have a tendency to snap before enough force is generated to lift the battery. When the pull tab is ripped, the servicing technician has to resort to prying the battery out of the device.

Presently, the most common type of battery used in portable computing device is a lithium ion battery. Prying against the lithium ion battery can cause the battery to be punctured. When punctured, the lithium-ion battery can ignite and cause irreversible damage to the portable computing device and potentially harm the serving technician.

Several battery removal methods have been proposed—for example, in U.S. Pat. No. 0,355,207 (2014) to Stephens, U.S. Pat. No. 0,229,766 (2009) to Aveldson, U.S. Pat. No. 0,064,386 (2015) MAG, and U.S. Pat. No. 0,192,550 (2016) Casebolt. Although inexpensive to manufacture, capable of attaching the battery securely to the housing, and producible in removable strips, such methods are useless if the pull away adhesive strips break or tears while applying a pulling force. Thus, to remove the battery, one must resort to prying the battery from the portable computing device.

SUMMARY

This application describes various embodiments that relate to battery removal methods and apparatuses to be used with portable computing devices.

Advantages

Accordingly, several advantages of one or more aspects are as follows: to provide a safe and efficient method for removing batteries from portable computing devices, that significantly reduces the chances of puncturing a battery, that can be used with any portable computing device— regardless of the size, make, or model of the portable computing device, that aids in the learning curve for inexperienced technicians, that is easy to manufacture and distribute, that, in some cases, reduce the amount of time to remove a battery, and that significantly reduces the potential harm to the servicing technician. Other advantages of one or more aspects will be apparent from a consideration of the drawings and ensuing description.

DRAWINGS—FIGURES

In the drawings, closely related figures have the same number but different alphabetic suffixes.

Drawings - Reference Numerals

| | | | |
|---|---|---|---|
| 100 | Housing | 118 | Heating Pad |
| 101 | Flexible Tube Coupler | 120 | Heat Retardant Material |
| 102 | Tube | 122 | PID temperature controller |
| 103 | Top Surface Layer | 124 | Up/Down Switch |
| 104 | Lift Beam | 126 | ON/OFF Vacuum Switch |
| 105 | Mounting screws | 127 | Bottom Surface Layer |
| 106 | Upper Adjustment Nut | 128 | Size Adjustment Holes |
| 107 | Coupler | 130 | Vacuum Suction Cup |
| 108 | Side Adjustment Groove | 132 | Clamp Padding |
| 110 | Grip Adjustment Knob | 134 | Threaded Hollow Screw |
| 112 | Clamp Jaw | 136 | Lower Adjustment Nut |
| 114 | Size Adjustment Knob | 138 | Lift Stabilizer |
| 116 | Clamp System | 140 | Linear Actuator |
| 200 | Speed Controller Knob | 301 | Vacuum Exit Valve |
| 201 | ON/OFF Power Switch | 302 | Vacuum Enter Valve |
| 202 | Power Socket | 304 | Power Supply |
| 204 | Smart phone housing | 306 | Stabilizer Glide |
| 206 | Adhesive Pull Tabs | 308 | Stabilizer Rail |
| 208 | Battery | 310 | Center Wall |
| 400 | Size Adjustment Groove | | |
| 300 | Vacuum Pump | | |

DETAILED DESCRIPTION—FIGS. 1A AND 1B—FIRST EMBODIMENT

The detailed description is set forth with reference to the accompanying drawings. In the drawings, the left-most digit(s) of a reference numeral identifies the drawing in which the reference numeral first appears. The use of the same reference numerals may indicate similar or identical items. Various embodiments may utilize elements and/or components other than those illustrated in the drawings, and some elements and/or components may not be present in various embodiments. These examples are being provided solely to add context and aid in the understanding of the described embodiments. Measurements are used as an example and can vary. It will thus be apparent to one skilled in the art that the described embodiments may be practiced without some or all of these specific details. In other instances, well known processes and/or components have not been described in detail in order to avoid unnecessarily obscuring the described embodiments. Other applications are possible, such that the following examples should not be taken as limiting.

As set forth above, one common technique for securing a component (e.g., a battery) within a computing device involves using an adhesive layer. When the component needs to be removed from the computing device, service technicians are required to pry the component away from the housing of the computing device, which can potentially damage the component and/or housing. One technique that can be used to help mitigate this problem involves using a pull tab that facilitates a removal of the adhesive layer from between the component and the housing. However, in many cases the adhesive pull tabs becomes brittle and tends to break when the servicing technician applies a pulling force. The servicing technician then has to resort back to prying the component out of the computing device, which can potentially cause damage to the device and the servicing technician. Accordingly, the invention sets forth a component removal apparatus used for extracting a component secured to an interior surface of a housing by an adhesive layer (e.g., a battery).

Figure 1A:
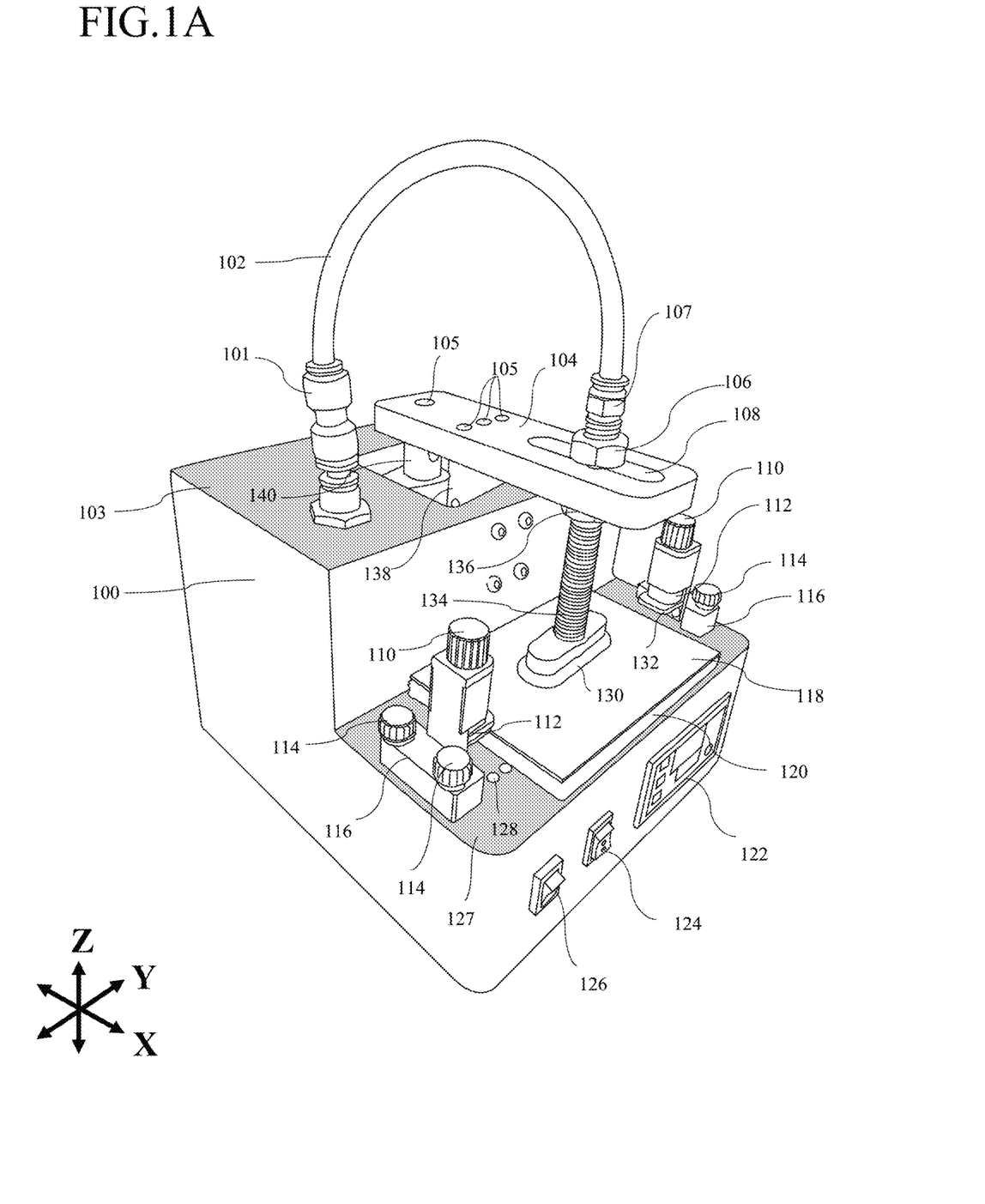
FIG. 1A shows a perspective view of a battery removal apparatus with a lifting mechanism contracted in accordance with one embodiment.
Figure 1B:
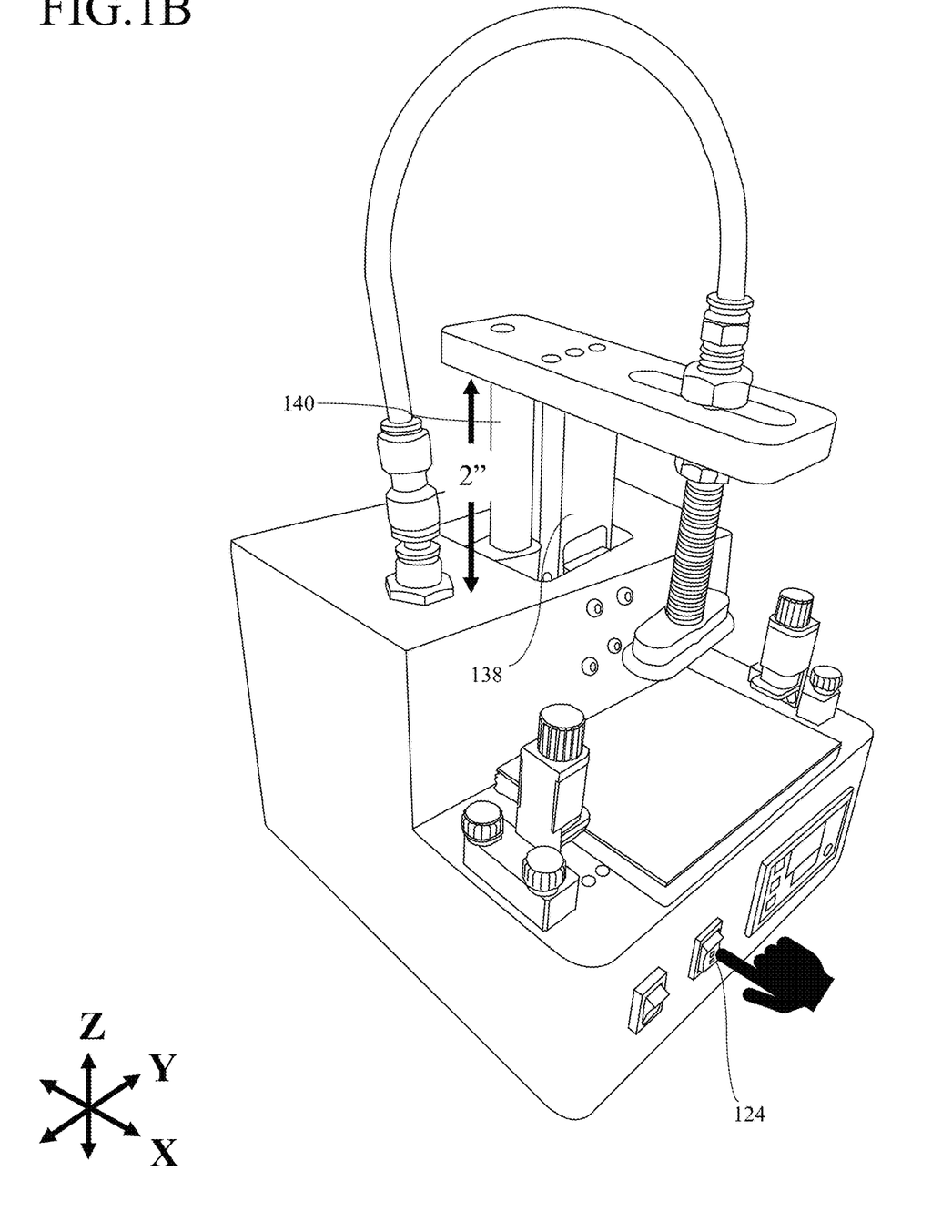
FIG. 1B shows a perspective view of a battery removal apparatus with a lifting mechanism extended in accordance with the same embodiment of FIG. 1.

FIG. 1A (perspective view) and FIG. 1B (perspective view) illustrates one embodiment of a battery removal apparatus. The battery removal apparatus has a base, housing, enclosure 100. The housing 100 is shaped as a cube with a quarter portion cut out as to create multiple surface layers. The housing 100 is a flexible metal sheet that can be shaped. However, the housing can consist of any material that can create and hold the described shape. A top surface layer 103 has an opening that allows a linear actuator 140 and a lift stabilizer 138 to protrude from the interior of the housing 100. The linear actuator 140 and lift stabilizer 138 are mounted to a lift beam 104 using mounting screws 105. The linear actuator 140 is mounted to the bottom of the housing 100. A lift beam 104 is positioned partially above the top surface layer 103 and extends over a bottom surface layer 127. The lift beam 104 can be made of, but not limited to, metal. The part of the lift beam 104 that is positioned over the bottom surface layer 127 has a side adjustment groove 108.

The top surface layer 103 also has a flexible tube coupler 101 that protrudes from it. One end of the flexible tube coupler 101 is connected to a plastic tube 102. However, the tube 102 is not limited to being made of plastic. The tube 102 can be made of any material that can create a vacuum. The tube 102 is connected to a hollow threaded screw 134 using a coupler 107. The hollow threaded screw is 134 is positioned through the side adjustment groove 108 of the lift beam 104. A vacuum suction cup 130 is attached to the other end of the threaded screw 134. The vacuum suction cup is made of silicone, but it can also be made of other materials such as natural rubber, nitrile butadiene rubber (NBR), etc. An upper adjustment nut 106 is positioned on to the top of the threaded screw 134 and above the lift beam 104. A lower adjustment nut 136 is positioned lower down the threaded screw 134 and beneath the lift beam 104.

The bottom surface layer 127 comprises a clamp system 116 on both ends. The clamp system 116 incorporates a size adjustment knob 114, a grip adjustment knob 110, and a clamp jaw 112. A clamp padding 132 is attached to the bottom of the clamp jaw 112. The clamp padding 132 can be made of, but is not limited to, rubber, plastic, foam, etc. The housing 100 has a size adjustment hole 128. The bottom surface layer 127 also has a heating pad 118. A heat retardant material 120 is attached to the bottom of the heating pad 118.

A side of the housing 100 (marked on the compass with an "X") of FIG. 1A and FIG. 1B, has a ON/OFF vacuum switch 126, a Up/Down switch 124, and a PID temperature controller 122.

An extended state of one embodiment of a battery removal apparatus is shown in FIG. 1B. The linear actuator 140 has a stroke of 2 inches. However, the stroke is not limited to 2 inches, the stroke can be more or less than 2 inches. A stroke of 2 inches is used just as an example in this embodiment and should not limit the scope of this disclosure.

Figure 2A:
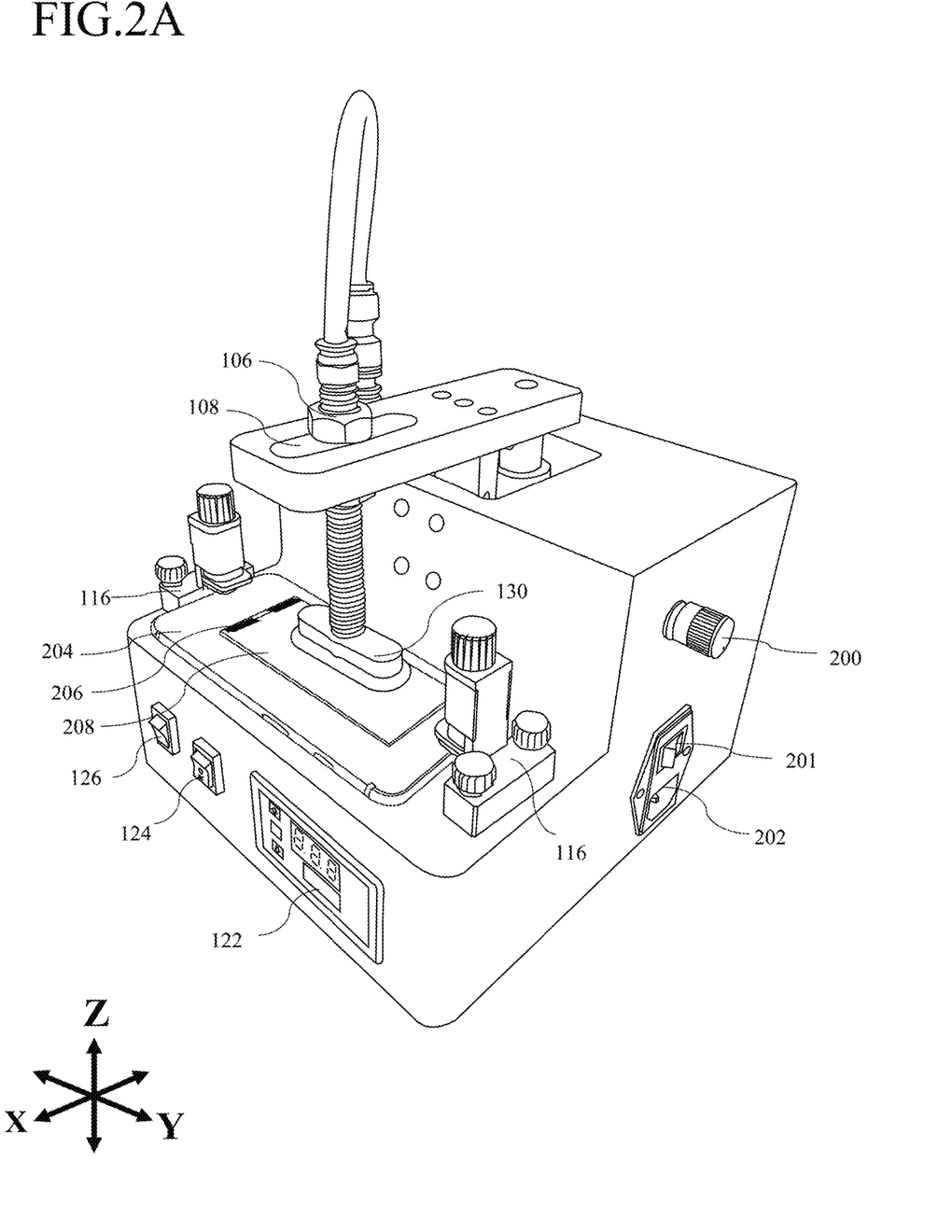
FIG. 2A shows a perspective view of a battery removal apparatus with a cell phone that has the display panel removed.
Figure 2B:
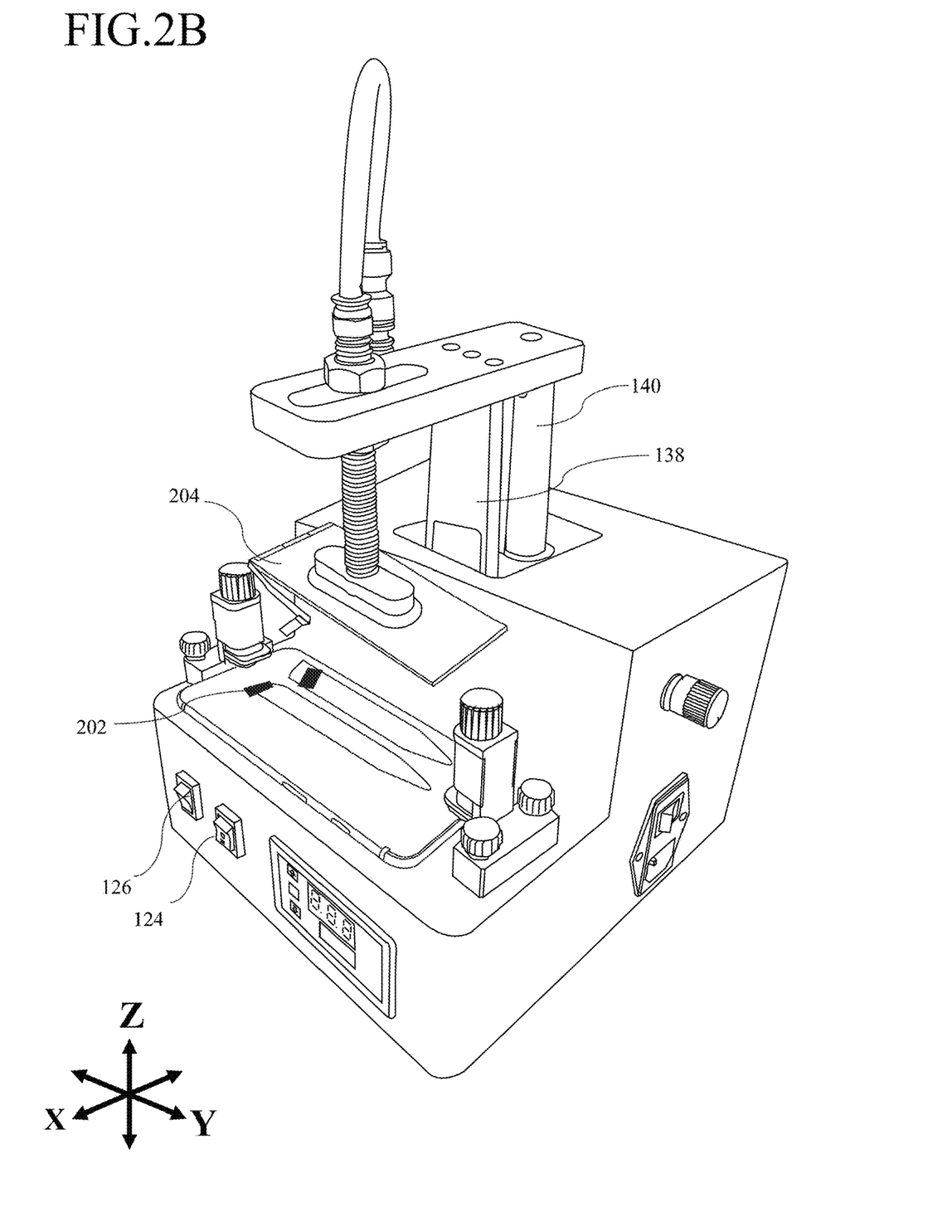
FIG. 2B shows a perspective view of a battery removal apparatus with the battery removed from a cellphone.

FIG. 2A (perspective view) and FIG. 2B (perspective view) illustrates one embodiment of a battery removal apparatus. A speed controller knob 200 is positioned on the exterior of the housing 100. An On/Off power switch 201 and a female power socket 202 is located on the exterior of the housing 100. However, another embodiment of a battery removal apparatus may not use alternating current and can use a direct current, such as a battery, to power the device.

Recently, portable computing device manufacturers have designed smart phones and tablets with the battery adhered to the interior housing of the device. As a result, the display panel or back plate of the portable computing device has to be removed to gain access to the battery of the portable computing device. FIG. 2A shows a smart phone 204 with its display panel removed. The smart phone housing 204 is positioned on the bottom surface layer 127. The smart phone housing 204 is secured by a clamp system 116 on both ends. The smart phone 204 is placed so that a battery 208 is positioned directly underneath the vacuum suction cup 130. An adhesive pull tab 206, disclosed by MAG, U.S. Pat. No. 0,064,386, 2015, secures the battery 208 to the smartphone housing 204.

FIG. 2B shows the battery 208 removed from the smart phone housing 204. The battery 208 is attached to the vacuum suction cup 130 and suspended above the smart phone housing 204. The linear actuator 140 and the lift stabilizer 138 are in an extended state. The adhesive pull tab 206 remains attached to the smart phone housing 204.

Figure 3:
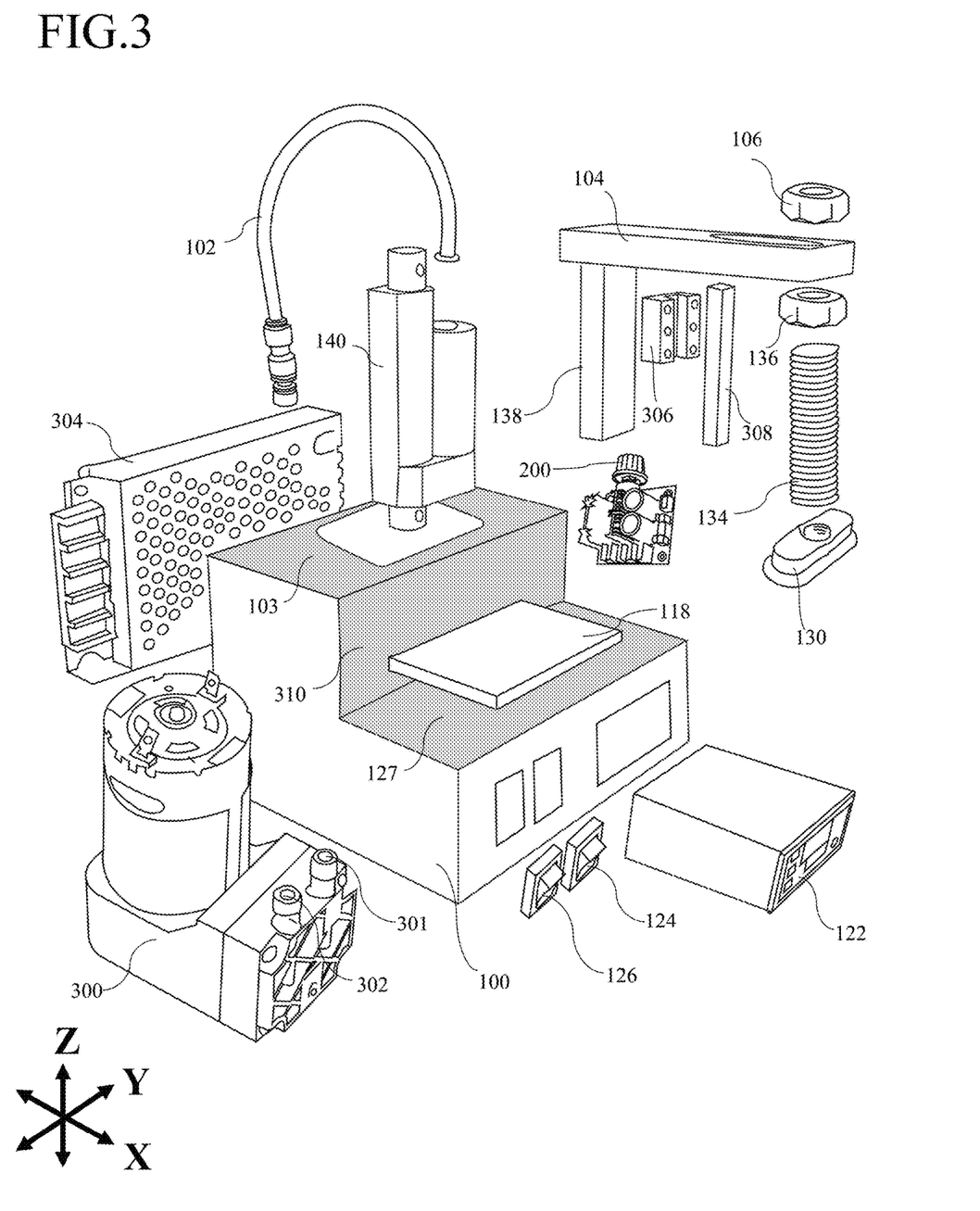
FIG. 3 shows an exploded view of a battery removal apparatus in accordance with the same embodiment of FIG. 1.

FIG. 3 illustrates an exploded view of a battery removal apparatus in accordance with one embodiment. A vacuum pump 300 is positioned on the left side of the housing 100. The positioning of the internal components is not limited to this embodiment. The internal components can be positioned in any way to fit the housing 100. This description enables someone skilled in the art to create a battery removal apparatus and sure not be used to limit the scope of this disclosure. The vacuum pump comprises an exit valve 301 and an enter valve 302. Although it is not illustrated, the other end of the tube 102 is attached to the enter valve 302. A power supply 304 is positioned to the back on the housing 100. A stabilizer rail 308 is mounted to the inside of a center wall 310. A stabilizer glide 306 is mounted to the lift stabilizer 138.

Figure 4A:
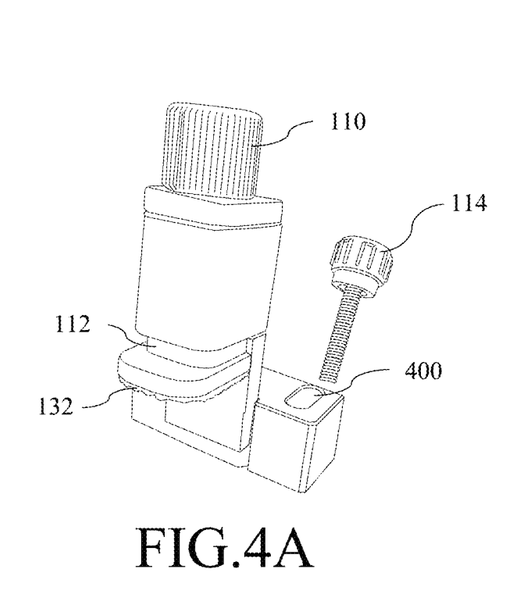
FIGS. 4A, 4B, 4C show various aspects of a clamp system used to secure a portable computing device on to a battery removal apparatus in accordance with one embodiment.
Figure 4B:
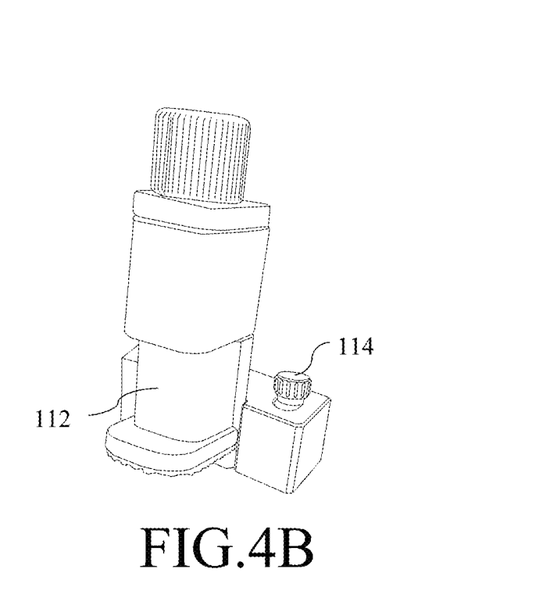
Figure 4C:
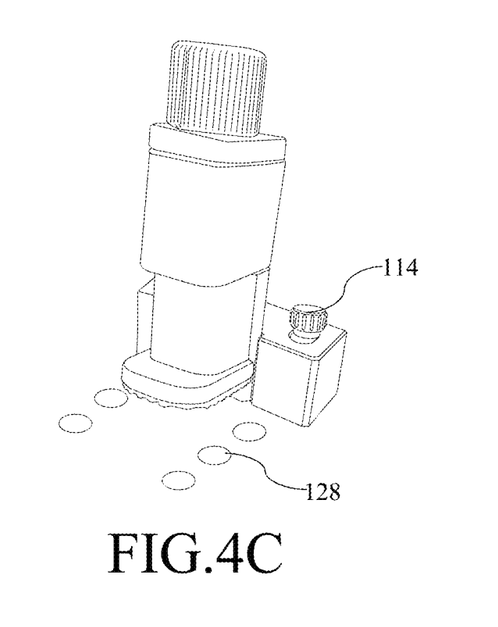

FIGS. 4A, 4B, and 4C illustrates a clamp system 116. FIG. 4A shows the clamp jaw 112 in a retracted state. The size adjustment knob 114 is positioned through a size adjustment groove 400. FIG. 4B shows the clamp jaw 112 in an extended state. In FIG. 4C, the size adjustment knob 114 is screwed into one of the size adjustment holes 128.

Figure 5:
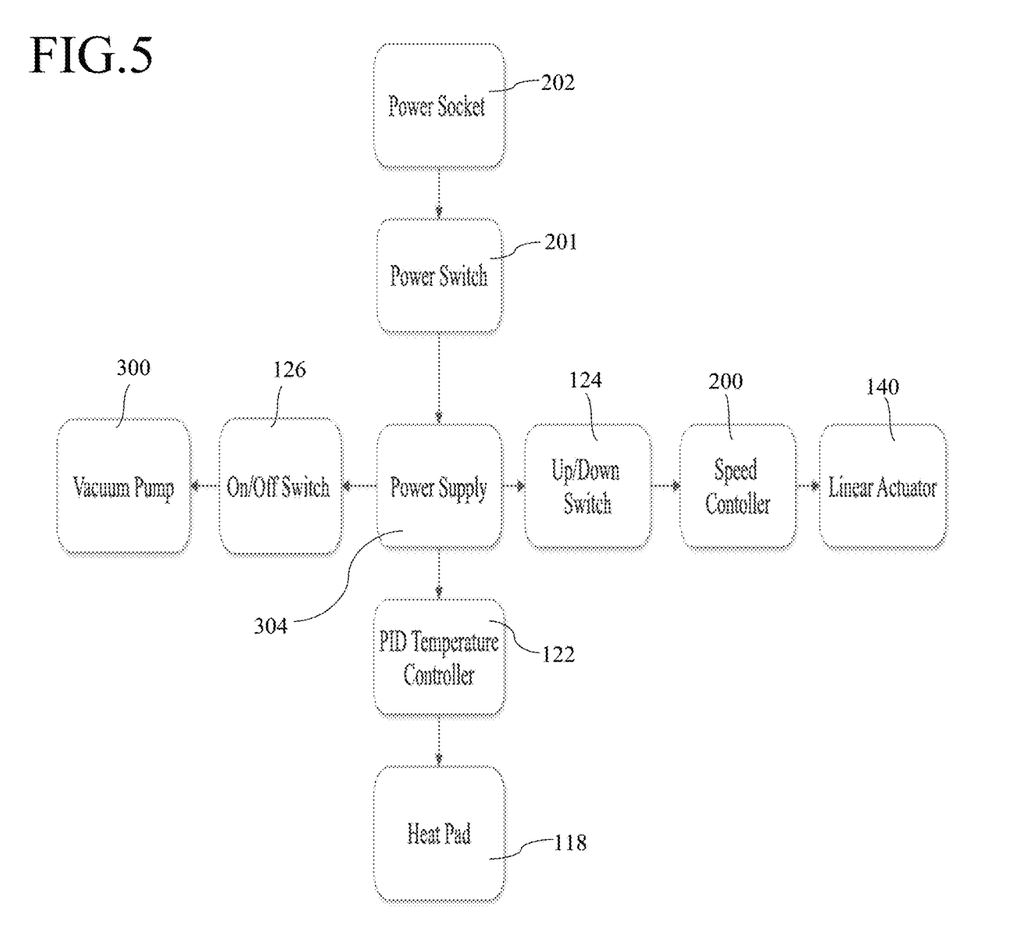
FIG. 5 illustrates a block diagram of the wiring of a battery removal apparatus.

FIG. 5 shows a block diagram of the electrical wiring of a battery removal apparatus in accordance with one embodiment. This diagram is shown only to aid someone skilled in the art in making a battery removal apparatus and should not be used to limit the scope of this application.

Operation—FIGS. 1A, 1B, 2A, 2B, 3, 4, 5

The following detailed operation description is provided to help someone skilled in the art create and use a battery removal apparatus. A smart phone is used as an example in this description. However, the battery removal apparatus is not limited to use with only smart phones. The battery removal apparatus can also be used with tablets and other portable computing devices.

As mentioned before in paragraph 20, someone skilled in the art would first remove the display or back plate from the portable computing device to gain access to the battery. Then, in accordance with one embodiment of a battery removal apparatus, one would first adjust the clamp system 116 in order to compensate for the size of the smart phone housing 204. The clamp system 116 can be adjusted by positioning the size adjustment groove 400 over one of the size adjustment holes 128. The device is then positioned onto the heating pad 118 so that the top and bottom (or side) edges of the smart phone housing 204 sits beneath the clamp jaw 112. The device should be positioned so that the exposed battery 208 faces the vacuum suction cup 130. The size adjustment knob 114 is then screwed into one of the size adjustment holes 128 to secure the clamp system 116 in place. The grip adjustment knob 110 is then twisted to lower the clamp jaw 112 down enough to secure the device in place.

One then turns on the apparatus by pressing the ON/OFF power switch 201 to the ON position. This will allow the heat pad 118 to heat to a desired temperature. The heating pad 118 will then begin to heat the back side of the smart phone housing 204. The device should be heated to roughly seventy to eighty degrees Celsius for roughly five to ten minutes. Temperature and heat time requirement may vary. This causes the adhesive pull tabs 206 layered between the battery 208 and the smart phone housing 204 to soften. Once the adhesive pull tabs 206 (or any other types of adhesive layer) is softened, one would then position the vacuum suction cup 130 above the battery 208. Portable computing device manufacturers commonly position the battery on either the left or right side of the device housing. The side adjustment groove 108 allows one to adjust the vacuum suction cup 130 to either side of the device. One would slide the threaded hollow screw 134 along the side adjustment groove 108 and tighten the upper adjustment nut 106 and the lower adjustment nut 136 to secure the threaded hollow screw 134 in place.

Once the vacuum suction cup 130 is positioned above the battery 208, one would then lower the lift beam 104 down by pressing the Up/Down switch 124 in the down position. The Up/Down switch is wired to a linear actuator 140 with a stroke of two inches. However, another embodiment may use a linear actuator with a different stoke length. Once the vacuum suction cup 130 is rested to the top of the battery 208 (as illustrated in FIG. 2A) one then turns on the vacuum pump 300. The vacuum pump can be turned on by switching the ON/OFF vacuum switch 126 to the on position. The vacuum suction cup 130 will then suction to the top surface of the battery 208.

The strength of the adhesive layer will vary depending on the type of the adhesive. Some adhesives may be stronger than others and thus take longer to soften. Notably, the speed at which the battery is lifted out of the device may also vary. Some adhesives may require a pulling force to be applied at a slower pace than others. For example, the linear actuator 140 extends at a rate of one tenth of an inch per second in accordance with one embodiment. At this speed, the battery 208 has enough time to detach from the adhesive pull tab 206. Different adhesives may require a faster or slower pace to be removed. The speed controller knob 200 can be tuned in order to speed up or slow down the linear actuator 140.

Once the speed controller knob 200 has been set to the appropriate speed, one then presses the Up/Down switch 124 in the up position to allow the linear actuator 140 to extend. This will cause the cause the battery 208 to be lifted out of the smart phone housing 204. Once the battery 208 is detached from the adhesive, it will be suspended above the smart phone housing 204 and still attached to the vacuum suction cup 130. One would then switch the ON/OFF vacuum switch 126 to the off position to release the vacuum suction cup 130 from the battery 208.

CONCLUSION, RAMIFICATIONS, SCOPE

Accordingly, the reader will see that the battery removal apparatus of various embodiments can be used to safely and efficiently remove batteries from portable computing devices, can be easily manufactured and distributed, and can be used with any type for portable computing device that comprises a battery. In addition, when a battery has been removed with the described battery removal apparatus, the adhesive layer remains in the portable computing device and can be reused to install a new battery. Also, the battery removal apparatus will make it easier for the servicing technician to remove a battery by eliminating the need to pry against the battery. Furthermore, the battery removal apparatus has the additional advantages in that:

It reduces the learning curve for new servicing technicians

It reduces the amount of time to remove a battery from a portable computing device (in most cases)

It eliminates the risk of puncturing the battery

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are
presented for purposes of illustration and description. They are not intended to be exhaustive or to limit the described embodiments to the precise forms disclosed. It will be apparent to one of ordinary skill in the art that many modifications and variations are possible in view of the above teachings. The various aspects, embodiments, implementations or features of the described embodiments can be used separately or in any combination. Various aspects of the described embodiments can be implemented by software, hardware or a combination of hardware and software.

Thus, the scope of the embodiments should be determined by the appended claims and their legal equivalents, rather than by the examples given.

I claim:

1. A battery removal apparatus, comprising:
   a. a housing of sufficient size to accommodate a portable computing device;
   b. a heating member affixed to said housing such that the portable computing device can rest on a heating surface of the heating member, wherein the heating member is at least one of a heat pad and a hot plate;
   c. a clamp system attached to the housing for securing the portable computing device to said housing;
   d. a suction member coupled to a vacuum pump and configured to attach to the battery of the portable computing device while the portable computing device is secured to said housing; and
   e. a linear actuator coupled to said suction member configured to lift and lower said suction member.

2. The battery removal apparatus of claim 1 wherein said heating surface incorporates a temperature relay controller.

3. The battery removal apparatus of claim 1 wherein said linear actuator is affixed to a speed controller switch.

4. The battery removal apparatus of claim 1, wherein the housing is shaped as a cube with a quarter portion cut out as to create a plurality of surface layers.

5. The battery removal apparatus of claim 1, further comprising a lift stabilizer coupled to a lift beam member.

6. The battery removal apparatus of claim 5, wherein the lift beam member further comprising a side adjustment groove.

7. The battery removal apparatus of claim 1, wherein the clamp system comprising a pair of clamps mounted on the opposite sides of the housing; and wherein each clamp comprising a size adjustment knob, a grip adjustment knob, and a clamp jaw.

8. The battery removal apparatus of claim 7, further comprising a clamp padding attached to the bottom of the clamp jaw.

* * * * *